June 8, 1926.
N. C. NELSON
1,587,980
SHACKLE FOR TIRE CHAINS
Filed June 11, 1925
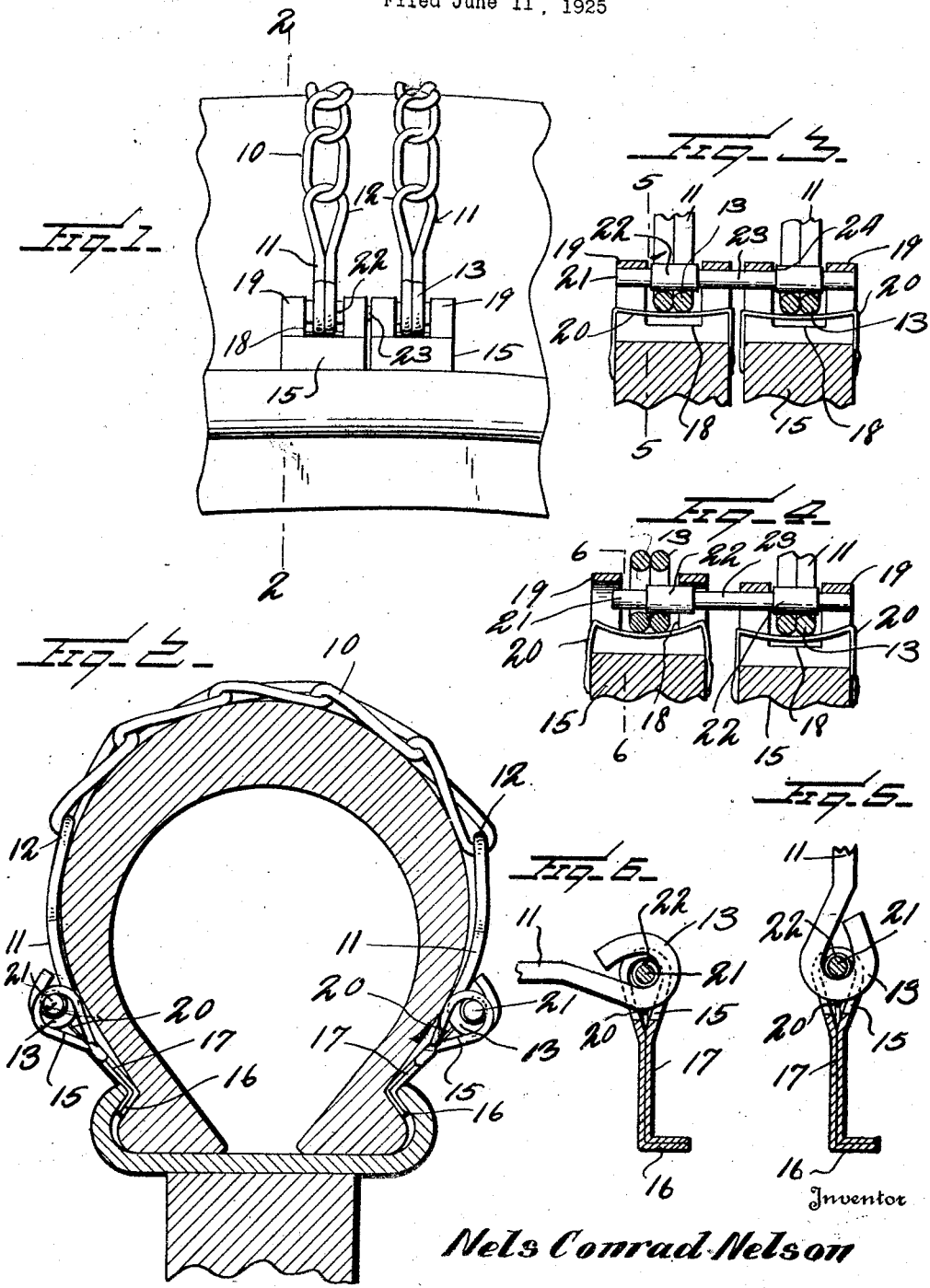
Inventor
Nels Conrad Nelson
By Watson E. Coleman
Attorney Patented June 8, 1926.

1,587,980

UNITED STATES PATENT OFFICE.

NELS CONRAD NELSON, OF GRANDVIEW, WASHINGTON.

SHACKLE FOR TIRE CHAINS.

Application filed June 11, 1925. Serial No. 36,446.

This invention relates to tire binders, that is, devices designed for the purpose of holding together and in correct shape the blown-out, bulged, rim cut, or otherwise weakened automobile tire as, for instance, a tire of the clincher type.

The object of the present invention is to provide a device of this character consisting of a plurality of chains adapted to pass across the face of the tire and around the same, having shackles at their extremities which are engaged with the rim of the wheel to thereby prevent the tire from further blowing out or bulging under the pressure of the air inside and the deformation to which the tire is subjected.

A further object is to provide a device of this character in which the chains are provided with shackles which are detachable and reversible so that when one face of the chain forming the body of the binder has become worn unduly, the shackles may be reversed with relation to the chain so that the unworn portion or face of the chain may be utilized.

My invention is illustrated in the accompanying drawing, wherein:—

Figure 1 is a fragmentary side elevation of a tire showing my tire binder in place thereon;

Figure 2 is a section on the line 2—2 of Figure 1;

Figure 3 is a longitudinal section through the shackles engaging the rim and through the end links;

Figure 4 is a like view to Figure 3 showing the end links shifted to a position permitting the removal of the pin;

Figure 5 is a section on the line 5—5 of Figure 3;

Figure 6 is a section on the line 6—6 of Figure 4, both of the last named figures showing the end links and their flattened portions somewhat exaggerated.

Referring to this drawing, it will be seen that my improved binder consists of two parallel chains 10 shown as of the twisted link type such as commonly used for the ordinary cross skid chains, these chains terminating in the links 11, each link being formed of a single piece of wire bent upon itself to form a bight 12 which engages the adjacent link, and the two arms of the bent wire extending down parallel to each other at 13 and being bent around to form an eye.

Coacting with each chain 10 is a shackle, designated generally 15, this shackle being formed of a single strip of metal, the strip being doubled upon itself and bent so as to form the bill 16, the shank 17 and the eye portion. This eye portion, where the two thicknesses of metal are separated, is deformed to provide a transversely extending eye or eyes. This strip previous to bending it into the hook form is slotted at 18 and this slot intersects the eye portion of the strip so as to provide two eyes 19 on each side of the slot 18. These eyes 19, as shown, are somewhat ovoid in cross section, and attached to the shackle 15, as for instance, by being soldered thereto is the transverse resilient bar 20 which is disposed so as to extend across the slot 18 at the base thereof just above the end of the slot.

Disposed through the eyes 13 and 19 is a pin 21. This pin is designed to engage the shackles and links 11 of both chains 10 and the pin 21 inward of each end is formed with an enlarged cylindrical portion 22 separated by a reduced portion 23 which has a diameter equal to the normal diameter of the pin. The enlarged portion 22 fits within the eyes 14, while the reduced portions 21 and 23 fit within the eyes 19. The bills 16 of both shackles extend in the same direction and these shackles are adapted to be engaged with the clincher flanges of the rim.

It will be noted from Figure 3 that when the shackles 15 are disposed in approximate alignment or at only a slight angle to the links 11 that the inner edges of the eyes 19, which inner edges are defined by the slot 18, bear against the shoulders or annular end faces 24 formed by the intersection of the reduced portion 23 with the enlarged cylindrical portion 22 so that the shackles 15 cannot be slid laterally in either direction, and when both shackles are engaged upon the single rod 23 the same result is secured and both shackles are held from any lateral movement with relation to the bar 23 by the edges of the shackles bearing against the shoulders 24. These shackles cannot be shifted out of engagement with the shoulders by reason of the little cross bar 20 which at all times bears against the peripheral faces of the eyes 13 and, therefore, constantly holds the eyes 19 in the reduced portions of the pin 21. When, however, the shackles 17 are forced toward the hooks 11, the spring bar 20 will be depressed, thus permitting the shoulders on the portion 22 to slip past the eyes 19 as shown at the left hand side of Fig. 4 and if now the pintle 23 is shifted laterally while the shackle 17 is pressed toward the hooks 11, the pintle may be readily detached from the shackle 17. Thus, it will be seen that the deflection of the spring bar 20 towards the bottom of slot 18 facilitates the assembly and disassembly of the tire binder. Thus, the shackles may be readily detached to permit the ready reversal of the shackles with relation to the chain 10 so that when these chains become so worn on one side as to be useless the shackles may be reversed so as to permit the other side of the chain to be directed outward and the smooth side of the chain to be disposed against the tire.

This tire binder may be used with or without an inner tire, boot or other material, and in actual practice the construction is such that a small tire iron may be inserted directly above the hinge connection between the hook and the link 11 and used as a lever to cinch the chains over the tire, in the same operation forcing the shackles over the rim where they may be placed in correct position by the use of a screw-driver or similar tool. It will be seen, as before stated, that the construction of the hinge is such as to facilitate the easy reversal of the chains or hooks.

A device of this kind has been found to be very effective in actual practice, may be cheaply made, and is readily applied or detached.

I claim:—

1. In a device of the character described a link and a member for engagement therewith, the link having an eye and the member being formed to provide two aligned laterally spaced eyes between which the first named eye is received, a pintle extending transversely through all of said eyes, the pintle having a shoulder normally preventing its lateral movement out of engagement with one of said eyes, and a spring extending parallel to the pintle and urging the pintle in a direction to carry the shoulder into engagement with the wall of said last named eye.

2. In devices of the character described, a link and a member for engagement therewith, the link having an eye and the member being formed to provide two aligned, laterally spaced eyes between which the first named eye is received, a pintle extending transversely through all of said eyes and having a shoulder having a length equal to the distance between the two aligned eyes of said member, and a spring on said member urging the link outward and the shouldered portion of the pintle into the space between the aligned eyes of said member.

3. In devices of the character described, a link and a member for engagement therewith, the link having an eye and the member being formed to provide transversely aligned, spaced eyes between which the first named eye is received, a pintle extending transversely through all of said eyes, the pintle being formed intermediate its ends with a diametrically enlarged portion having shoulders at its ends and having a length equal to the distance between the inner edges of said aligned eyes in said member, and a spring mounted upon said member extending parallel to the pintle and urging the eye of the link and the pintle outward and the shoulder into engagement between the aligned eyes of the member whereby to prevent any longitudinal movement of the pin.

4. In devices of the character described, a pair of links and a shackle for engagement therewith, the links having aligned eyes and the shackle being formed to provide transversely aligned, spaced eyes between which the first named eyes are received, a pintle extending transversely through all of said eyes and having a diametrically enlarged portion formed to provide shoulders at the extremities and having a length equal to the distance between the eyes on the shackle, and a spring carried by said shackle and extending in the same plane as the pintle, said spring being longitudinally concave and bearing against the eyes of the links and urging said eyes and the pintle outward with the enlarged portion of the pintle between the eyes of the shackle.

5. In devices of the character described, a pair of links, each formed with an eye, a shackle for said links, the shackle being longitudinally slotted and formed to provide aligned eyes on each side of the slot, the eyes of the link being disposed in said slot, and a pintle disposed through all of said eyes, the pintle having an enlarged cylindrical portion fitting within the eye of the links and between the eyes of said shackle and said pintle having a reduced portion on each side of said cylindrical portion and loosely fitting within the eyes of the shackles, the shackle being provided at the base of its eyes with a longitudinally extending resilient bar bearing against the peripheries of the eyes on the links to thereby urge the links outward with reference to the hook and yieldingly hold the enlarged portion of the pintle between the inner edges of the eyes on the shackles.

In testimony whereof I hereunto affix my signature.

NELS CONRAD NELSON.